United States Patent [19]
Von Erichsen

[11] Patent Number: 5,749,703
[45] Date of Patent: May 12, 1998

[54] SHAFT ASSEMBLY FOR GAS CONTROL FLAP IN A GAS TURBINE

[75] Inventor: Volker Von Erichsen, Recklinhausen, Germany

[73] Assignee: Stober + Morlock Warmekraft Gesellschaft mbh, Recklinghausen, Germany

[21] Appl. No.: 644,849

[22] Filed: May 9, 1996

[30] Foreign Application Priority Data

May 19, 1995 [DE] Germany .......... 195 18 174.3
Sep. 23, 1995 [DE] Germany .......... 195 35 469.9

[51] Int. Cl.⁶ .................................................. F04D 29/44
[52] U.S. Cl. .......... 415/148; 137/875; 251/293; 251/308
[58] Field of Search .......... 415/148; 137/875; 251/293, 308; 403/359

[56] References Cited

U.S. PATENT DOCUMENTS

| | | | |
|---|---|---|---|
| 3,512,898 | 5/1970 | Rinker | 415/148 |
| 3,828,531 | 8/1974 | Quick | 415/148 |
| 4,977,791 | 12/1990 | Ericksen | 74/470 |
| 5,022,121 | 6/1991 | Rutz | 19/102 |
| 5,482,251 | 1/1996 | Roberts | 251/293 |

Primary Examiner—John T. Kwon
Attorney, Agent, or Firm—Herbert Dubno

[57] ABSTRACT

A gas turbine system has a shaft assembly for controlling a flap for the hot gases in the form of a solid stub shaft connected to a tubular shaft via a mechanical entrainer system either in the form of a set of links articulated to the stub shaft and the tubular shaft or in a radial claw arrangement in which between radial claws on the stub shaft, axial entrainers of the hollow shaft engage.

5 Claims, 3 Drawing Sheets

SHAFT ASSEMBLY FOR GAS CONTROL FLAP IN A GAS TURBINE

FIELD OF THE INVENTION

My present invention relates to a gas turbine system and, more particularly, to a shaft assembly for a gas flow control flap of a gas turbine, especially for a shaft assembly for setting a flow-blocking or flow control flap in a duct in which that assembly or flap can be in contact with hot gas and in which the shaft assembly has a driven side and serves for the transfer of a torque to the flap. More particularly, the invention relates to a shaft assembly of the type in which the driven side is formed by a massive or solid stub shaft while the load side, i.e. the side provided with the flap, is formed by a hollow, tubular or pipe-like shaft member.

BACKGROUND OF THE INVENTION

It is a common practice to provide flap-type control and flow blocking valves in gas turbine installations (see, for example, U.S. Pat. No. 5,022,121 and U.S. Pat. No. 4,977, 791), the flaps for switching over flow from one duct to another and/or blocking the ducts being used to control extremely large cross sections and thus being themselves relatively large and massive elements. In the past it has been a common practice to provide the shafts for such flaps, especially for gas turbine systems, with a solid driving stub shaft connected to the source of angular displacement, e.g. a servomotor or the like which has a diameter of 200 to 400 mm, and a driven member in the form of a pipe-like or tubular shaft with a diameter of 300 to 600 mm connected to the solid or massive stub shaft.

The relatively large diameters of the portions of the shaft assembly enable the latter to support heavy flaps for controlling the flow in large-cross section ducts.

The connection between the tubular shaft portion and the solid stub shaft portion generally was a flange connection in which one connecting flange on the stub shaft and another connecting flange welded to the tubular shaft were connected together by means of bolts.

It is, however, also possible to provide the stub shaft as a splined shaft and to provide the tubular shaft as an internally splined member or to enable the tubular shaft with an internally splined disk to effect a multiple-spline connection between the stub shaft and tubular shaft.

Each of the aforedescribed systems, however, must be capable of withstanding a temperature increase from the starting of the gas turbine within several seconds to 500° to 600° C. as hot gas flows around or into contact with the flap setting assembly. Because of the different thermal expansion characteristics of the solid and relatively massive driving stub shaft and the relatively thin walled tubular shaft, stresses develop which can lead to binding, deformation and damage of the connection between the two shaft members.

OBJECTS OF THE INVENTION

It is the principal object of the present invention, therefore, to provide an improved shaft assembly for transmitting torque to a control flap of a gas turbine system whereby the aforedescribed drawbacks are avoided.

Another object of the invention is to provide a gas turbine system with a shaft assembly which can adjust rapidly and without stress build up to rapid changes in temperature, e.g. as a result of contact with hot gases in a gas turbine, thereby avoiding deformation and damage to such a shaft system.

It is also an object of the invention to provide, in a gas turbine system of the type described, an improved shaft assembly for allowing transfer of torque to a flow directing or flow blocking flap of the turbine such that torque transmission without play is insured in spite of the rapid changes in temperature.

SUMMARY OF THE INVENTION

These objects and others which will become apparent hereinafter are attained, in a gas turbine system having a duct transversed by hot gas and comprising:

at least one flap pivotable in the duct to switch a flow direction or block flow through the duct;

a shaft assembly connected to the flap to apply torque thereto, the shaft assembly comprising a solid drive stub shaft and a hollow pipe-shaped shaft connected to the solid stub shaft, the solid stub shaft projecting with play axially into the hollow pipe-shaped shaft; and a mechanical entrainer system angularly coupling the solid stub shaft with the hollow pipe-shaped shaft for imparting torque to the flap and free from radial force transfer between the solid stub shaft with the hollow pipe-shaped shaft.

The mechanical entrainer system can comprise radial entrainers distributed about a periphery of the stub shaft, the stub shaft comprising generally tangential links articulated to the entrainers, a centering disk secured to the hollow pipeshaped shaft, the generally tangential links being pivotally secured to the disk.

Alternatively, the mechanical entrainer system can comprise an array of radial claws affixed to the stub shaft and projecting into the pipe, the pipe having a centering disk formed with axial entrainers engaging between the radial entrainers without angular play between the radial and axial entrainers.

According to the invention, therefore, a plurality of radial elements can be fixed to the solid drive shaft at angularly equispaced locations and each of these elements can be articulated to a link which extends tangentially and is in turn articulated at the opposite end a disk which is fixed to the tubular shaft. The disk can surround the stub shaft with just sufficient play to enable relative rotation of the stub shaft and the disk. With different thermal expansions of the stub shaft and tubular shaft, the diameter of the circle of the pivot points between the radial formations and the tangential formations on the one hand and between the tangential links and the centering disks on the other hand can alter but that will give rise to different tilts of the tangential links and only a minimal relative angular offset between the stub shaft and the tubular shaft. The shaft assembly itself will thus adjust to changes in temperature both during the heating and cooling phases without play. The centering disk insures coaxial positioning of the stub shaft and the tubular shaft in all positions of relative angular offsetting of the two resulting from the thermal expansion differences.

In the second approach provided with an array of radial claws between which axial formations of the tubular shaft engage, it is to be noted that the axial formations engage without play between pairs of the radial claws during the heating phase, a play which may exist in the cold state can be reduced progressively.

As a practical matter, that play can be reduced to zero when the entire shaft assembly is at a substantial elevated temperature.

In both embodiments, one or more further centering disks can be provided upon the stub shaft and can be surrounded by the tubular shaft with a minimum of radial play but enabling slight relative angular displacement of the two shaft members. The additional centering disks can optimize the centering. The centering disk can be juxtaposed with a fixing ring secured to the stub shaft or an equivalent shoulder can be formed on the stub shaft to provide additional fixing of the tubular shaft on the drive stub shaft in the axial direction.

BRIEF DESCRIPTION OF THE DRAWING

The above and other objects, features, and advantages will become more readily apparent from the following description, reference being made to the accompanying drawing in which.

SPECIFIC DESCRIPTION

Figure 4:
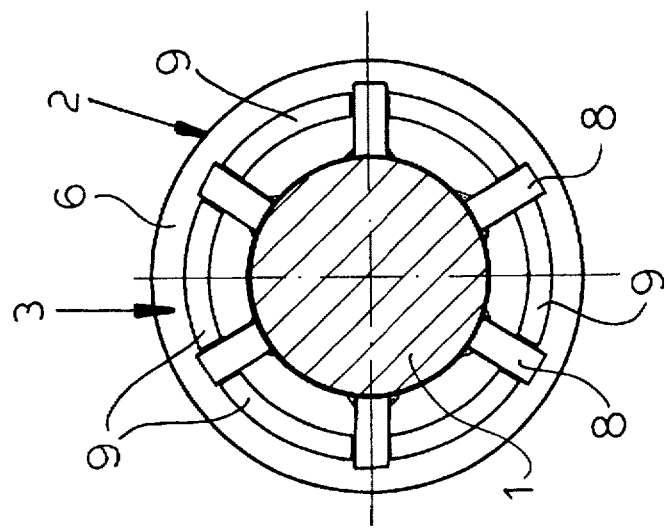
FIG. 4 is a section taken along the line IV—IV of FIG. 3.
Figure 5:
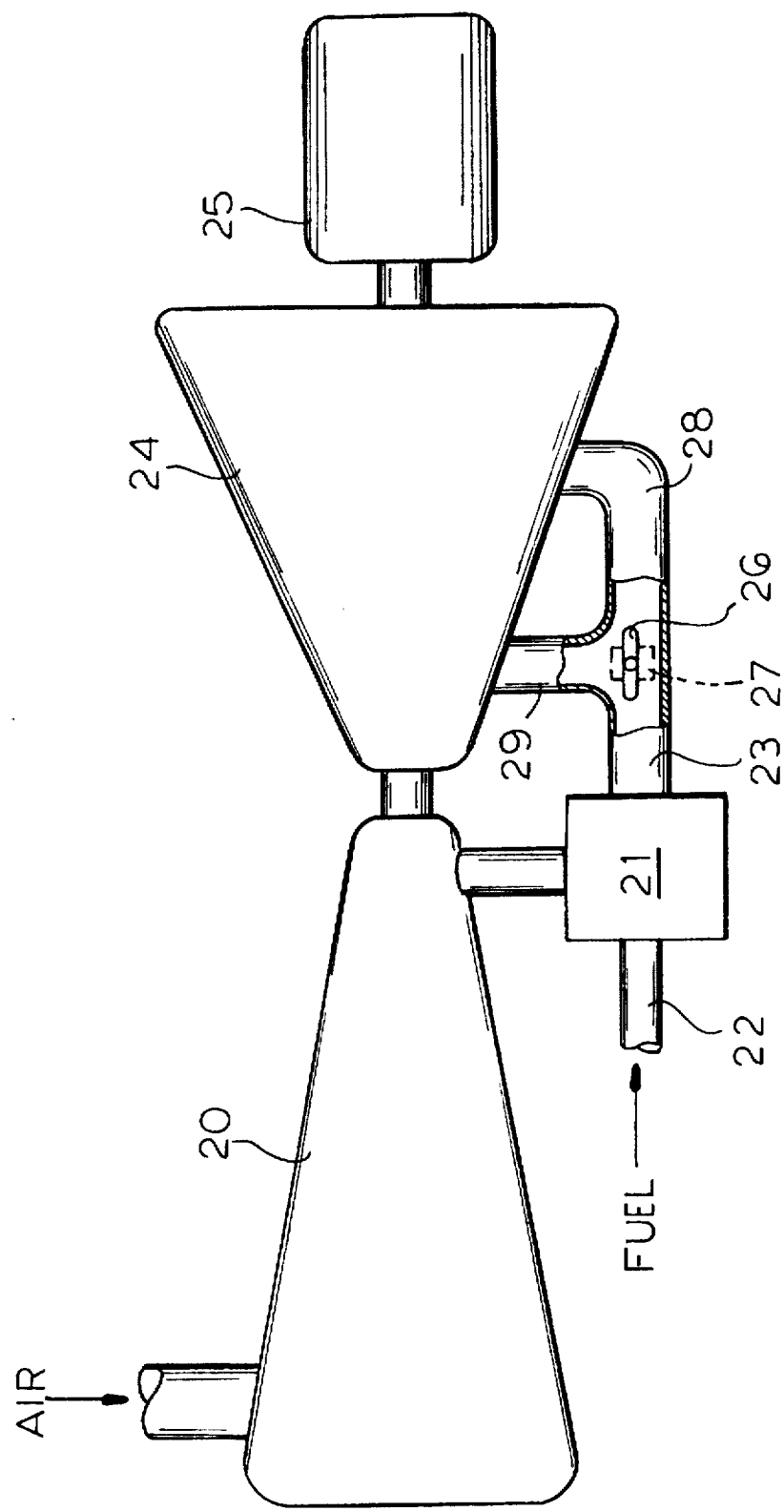
FIG. 5 is a diagram of a turbine system in accordance with the invention.

Referring to FIG. 5 in which a gas turbine system is shown, it can be seen that the compressor 20 can supply air to a combustion chamber 21 which is fed at 22 with fuel so that hot combustion gas flows through the duct 23 to either of two stages of a gas turbine 24 driving a generator 25. A flap 26 in the duct 23 can be rotated by a driver 27 to displace the flap angularly and control the flow between the duct portions 28 and 29 or to block the flow to duct portion 29. The flap 26 is carried by the tubular shaft portion of a shaft assembly to be described in connection with FIGS. 1 through 4 while the driver will be understood to be coupled to the massive or solid shaft portion.

FIGS. 1 through 4 show the setting unit 1,2 for a flap, e.g. the flap 26, which can constitute a direction switching flap or a flow blocking flap of the gas turbine unit.

The driven shaft assembly 1, 2 serves for transferring a torque to the flap from the driver. It comprises a massive or solid stub shaft 1 and a tubular shaft 2 connected to the stub shaft 1. The stub shaft 1 is loosely fitted into the tubular shaft 2 and thus has play therein. However, the stub shaft 1 and the tubular shaft 2 are interconnected by a mechanical entrainer system 3 capable of transmitting torque but which does not allow radial force transmission between these parts.

Figure 2:
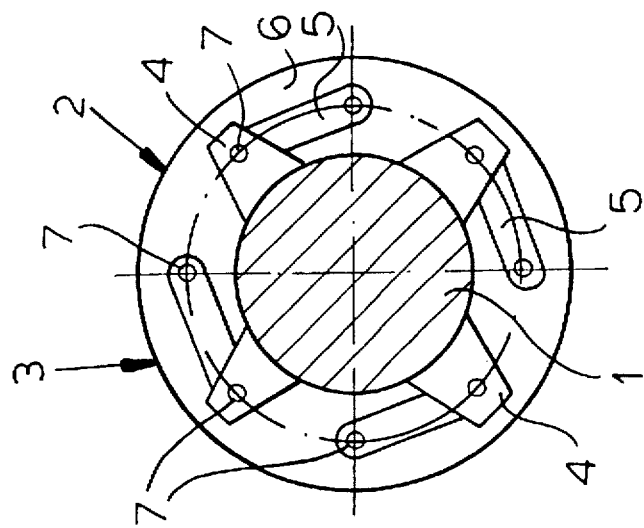
FIG. 2 is a section taken along the line II—II of FIG. 1.
Figure 1:
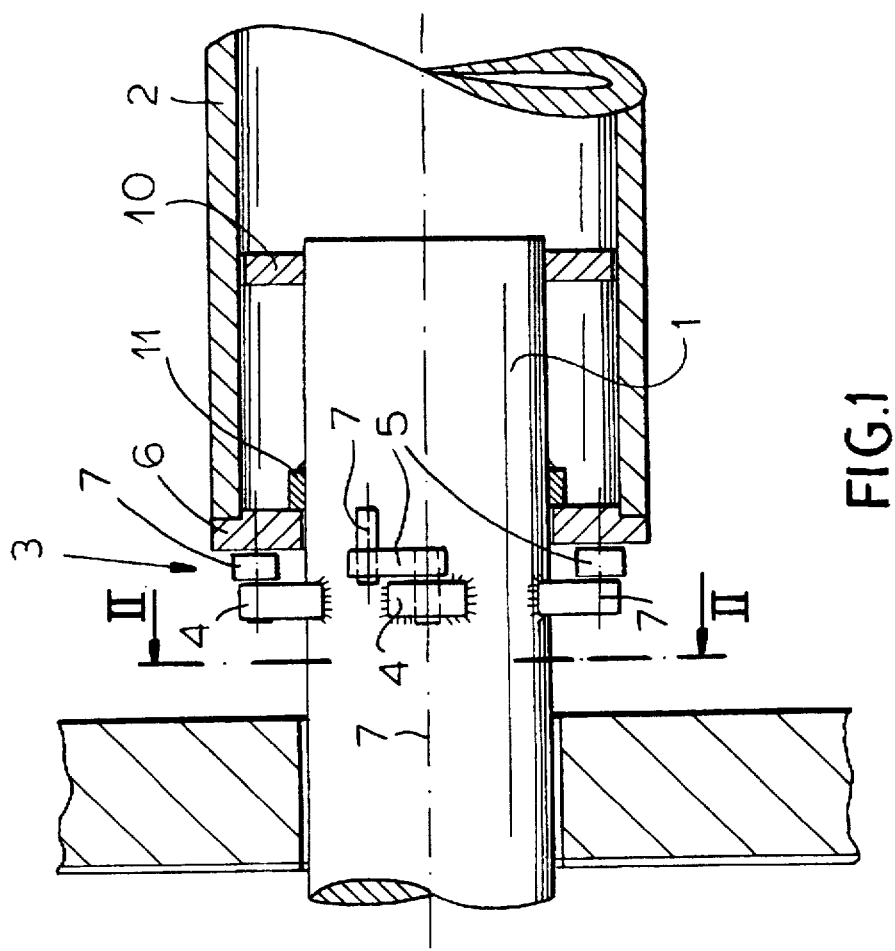
FIG. 1 is a fragmentary axial section of a setting apparatus for a gas turbine unit according to the invention.

In the embodiment of FIGS. 1 and 2, the mechanical entrainer system 3 comprises a plurality of angularly equispaced radial entrainers 4 welded to the stub shaft 1. At the free ends of member 4, tangential links 5 are articulated, the links 5 are arrayed along the periphery of the stub shaft 1. The links 5 are also articulated to a centering disk 6 welded to an end of the tubular shaft 2. The stub shaft 1 is fitted into the centering disk 6 with sufficient play to allow rotation of the stub shaft within the tubular shaft.

The pivots 7 between the links and the radial posts 4 on the one hand and the disk 6 on the other can lie along a common circle at room temperature as shown in FIG. 2. The pivots may be formed by pivot pins fixed to the link 5 and rotatable in the disk and in the post 4 respectively.

Figure 3:
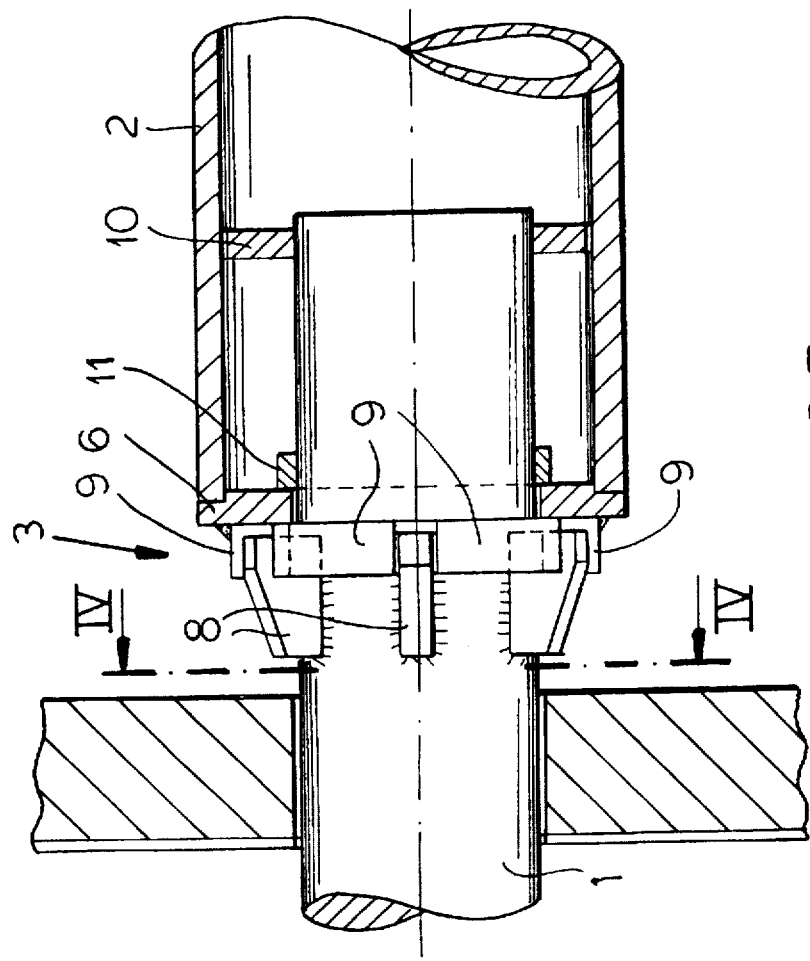
FIG. 3 is a view similar to FIG. 1 in accordance with another embodiment of the invention.

In the embodiment of FIGS. 3 and 4, the mechanical entrainer system 3 comprises a multiplicity of radial claws 6 welded to and distributed about the periphery of the stub shaft 1. On the tubular shaft 2 there are provided axial entrainers 9, in the form of circular arc segments between which the claws 8 are guided. These members are also welded to the tubular shaft 2, preferably on the centering disk 6 which is affixed at the end of the tubular shaft 2 in the manner previously described. The axial entrainers 9 are also disposed between the radial claws 6 free from play at room temperature.

In both embodiments the stub shaft 1 carries a further centering disk 10 which is preferably welded to the stub shaft and is surrounded by the tubular shaft 2 with sufficient play to allow rotation. The centering disk 6 is abutted in the axial direction by affixing ring 11 or a shoulder formed on the shaft 1. The fixing ring 11 may be force fitted onto the stub shaft 1 or welded thereto.

It will be apparent that, in the case of the embodiment of FIGS. 1 and 2, any differential thermal expansion of the shafts 1 and 2 will result in a pivoting of the links 5 without any change in the relative radial positions of these shafts so that compensation for dimensional changes resulting from sudden heating and cooling as when the shaft assembly is suddenly contacted with hot gas or the flow of hot gas is suddenly cut off, is effected without binding.

Since the claws 8 in the embodiment of FIGS. 3 and 4 are laterally engaged by the segments 9, there is also no binding in this embodiment with sudden heating and cooling.

I claim:

1. In a gas turbine system having a duct traversed by hot gas, the improvement which comprises:

at least one flap pivotable in said duct to switch a flow direction or block flow through said duct;

a shaft assembly connected to said flap to apply torque thereto, said shaft assembly comprising a solid drive stub shaft and a hollow pipe-shaped shaft connected to said solid stub shaft, said solid stub shaft projecting with play axially into said hollow pipe-shaped shaft; and a mechanical entrainer system angularly coupling said solid stub shaft with said hollow pipe-shaped shaft for imparting torque to said flap and free from radial force transfer between said solid stub shaft with said hollow pipe-shaped shaft.

2. The improvement defined in claim 1 wherein said mechanical entrainer system comprises radial entrainers distributed about a periphery of said stub shaft, said stub shaft comprising generally tangential links articulated to said entrainers, a centering disk secured to said hollow pipe-shaped shaft, said generally tangential links being pivotally secured to said disk.

3. The improvement defined in claim 1 wherein said mechanical entrainer system comprises an array of radial claws affixed to said stub shaft and projecting into said pipe, said pipe having a centering disk formed with axial entrainers engaging between said radial entrainers without play between said radial and other entrainers.

4. The improvement defined in claim 1 wherein a centering disk is affixed to said stub shaft, said disk being surrounded by said hollow shaft with play.

5. The improvement defined in claim 1 wherein a centering disk in said hollow shaft is formed with a collar fastened on said stub shaft.

* * * * *